Aug. 29, 1967  J. H. MITCHELL  3,338,557
LOG TRUCK TRAILER HOIST
Filed Feb. 17, 1966  3 Sheets-Sheet 3
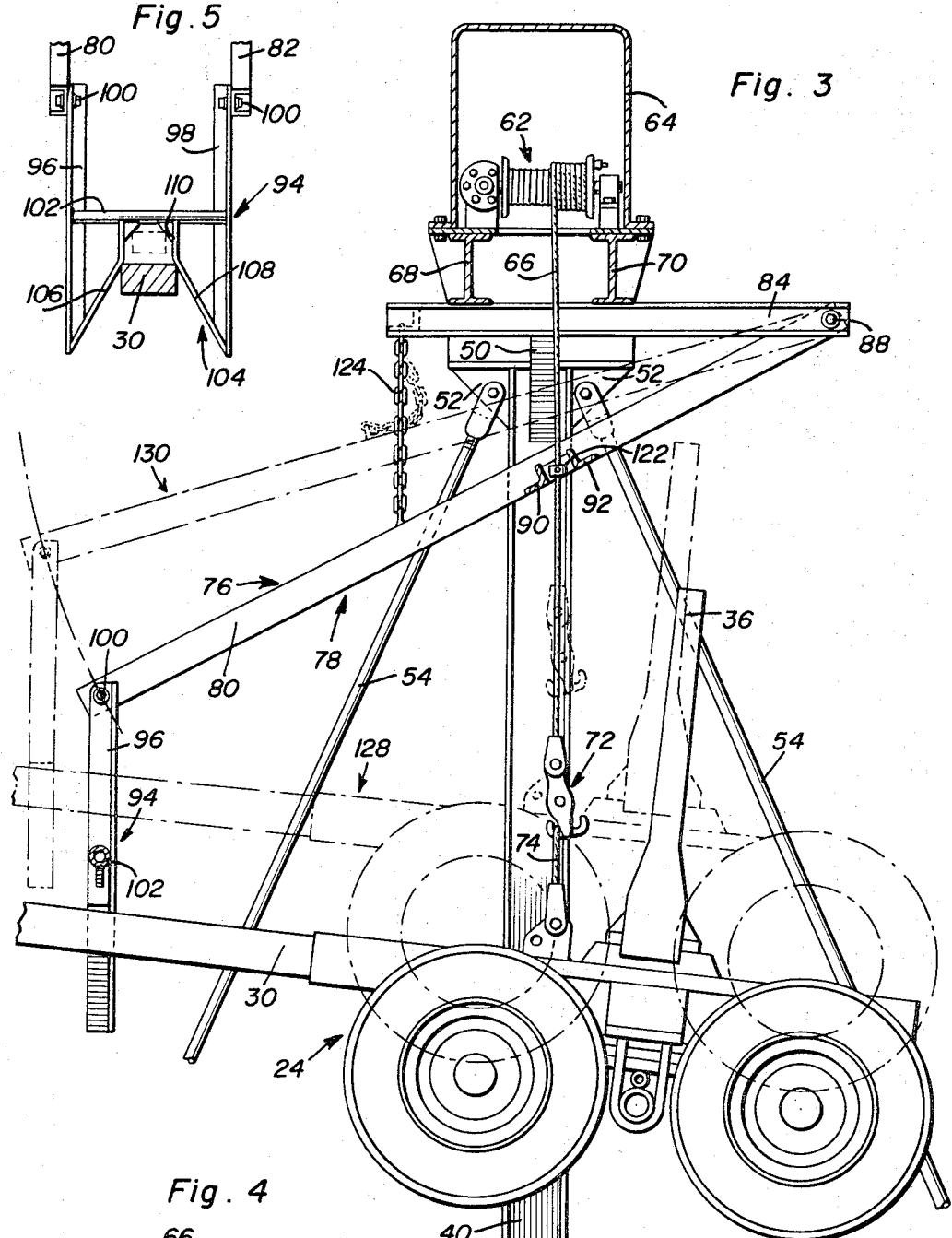
John H. Mitchell
INVENTOR.
BY Clarence A. O'Brien
and Harvey B. Jacobson
Attorneys

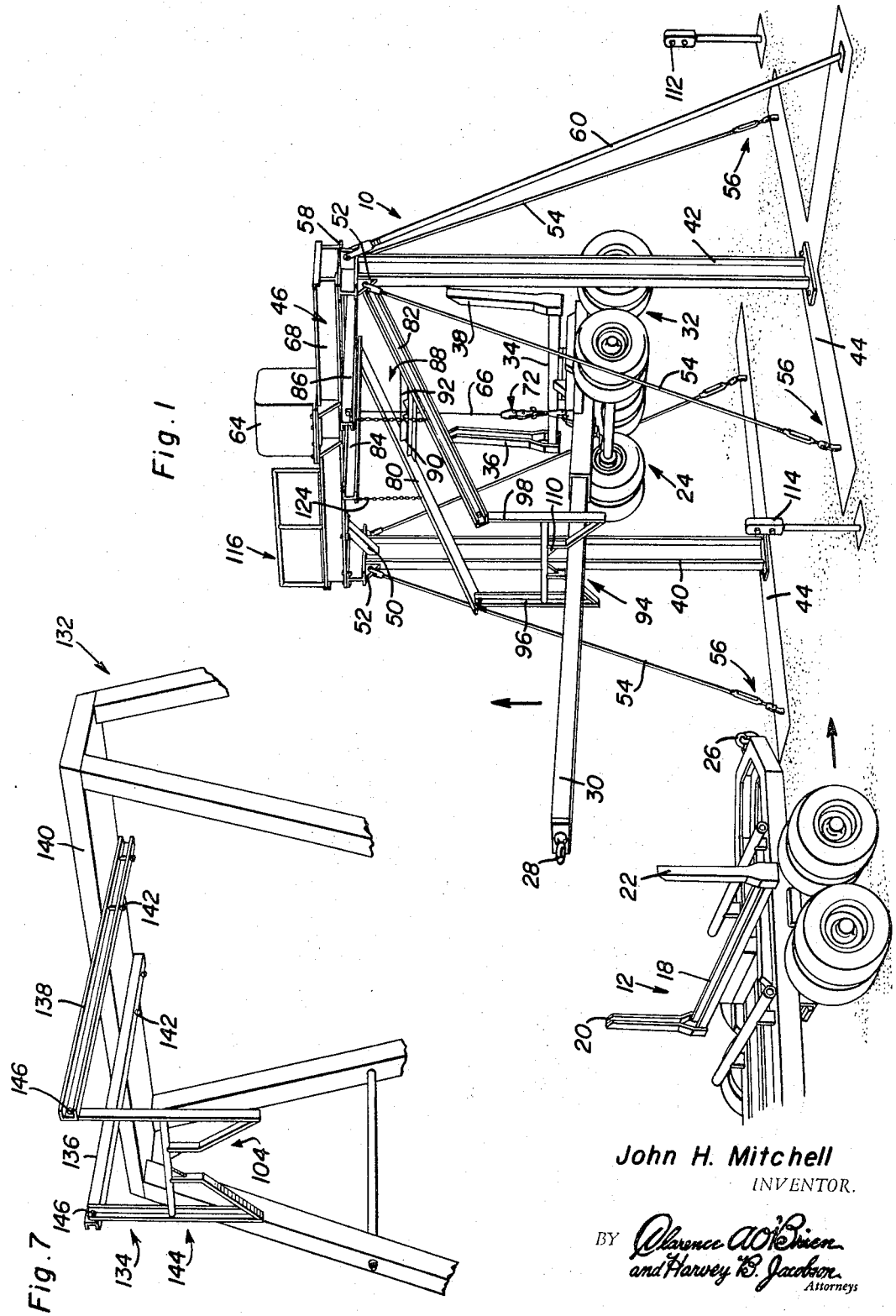

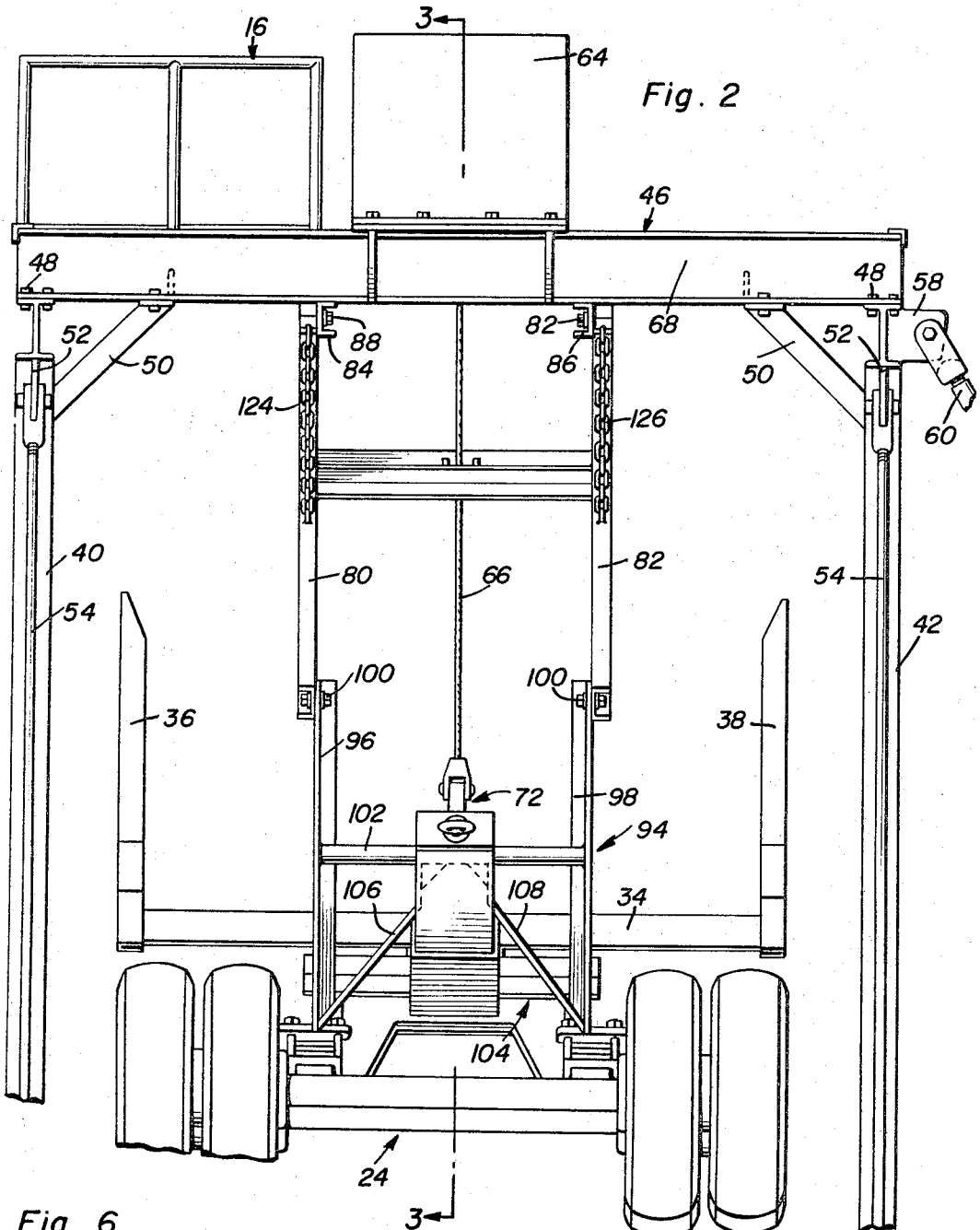
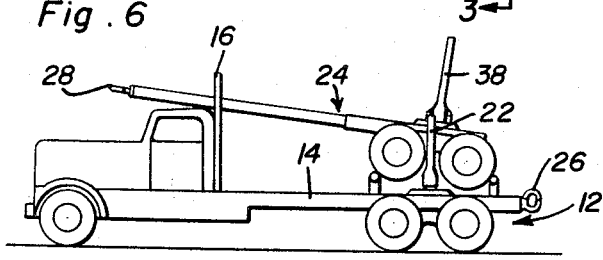

United States Patent Office 3,338,557
Patented Aug. 29, 1967

3,338,557
LOG TRUCK TRAILER HOIST
John H. Mitchell, 512 Westerly Drive,
Aberdeen, Wash. 98520
Filed Feb. 17, 1966, Ser. No. 528,243
13 Claims. (Cl. 254—139)

ABSTRACT OF THE DISCLOSURE

An overhead hoist supporting a winding member on which the upper end portion of a vertically disposed elongated and flexible tension member is partially wound, the lower free swinging end of the tension member including means adapted for securement to a logging trailer adjacent the center of gravity thereof and the hoist including depending guide means spaced horizontally from the lower end of the tension member and adapted to engage the forward end portion of the tongue portion of the logging trailer being hoisted by said tension member as the trailer is lifted from the ground with the tension member and depending guide means coacting to prevent free swinging movement of the trailer about the lower end portion of the tension member attached to the trailer.

---

This invention relates generally to logging trailer hoists and more specifically to a logging trailer hoist including a novel and unique reach guide.

In the past, hoists for logging trailers have been utilized to lift empty logging trailers up onto the trucks for transporting back to the logging operation. In order to do this, a conventional electric cable hoist, including a cable, winding drum and motor has been used, along with my automatic releasing hook, as described in my prior U.S. Patent No. 2,771,316, Nov. 20, 1956. However, a usual difficulty encountered with the prior art method of lifting logging trailers has been that the trailers, when lifted, tend to twist and turn about the lift hook. Hence, it usually requires at least two men to load trailers in this manner as one man is needed to operate the lifting mechanism, while one or more men are needed to stabilize the trailer reach in order to properly place the trailer on the truck. Thus, it will be appreciated that it is desirable to provide means to automatically stabilize the trailer reach during the lifting operation, eliminating any lateral swinging or sway of the reach pole, and therefore that this constitutes a principal object of the instant invention.

A further object of the instant invention is to provide a guiding yoke for trailer reaches which is operably associated with a cable hoist.

Another object of the present invention is to provide a guide yoke for use with logging trailer reaches which may be utilized with reaches of various sizes.

A further object of the present invention is to provide a novel operating relationship between a cable hoist for logging trailers and a guide means mounted on the cable hoist frame.

A still further object of the present invention is to provide a novel and unique reach guide yoke which is simple of construction while being quite sturdy and trouble-free in operation.

Another object of the present invention is to provide a swingable reach guide yoke assembly.

Yet another object of the present invention is to provide a novel cable drum and motor arrangement for use with the cable hoist and reach guide yoke of the instant invention.

Another object of the present invention is to provide a reach guide yoke which may be added to existing A frames.

A final object of the present invention is to provide means for loading logging trailers on trucks which is fast, efficient and extremely safe in operation, and which can be easily operated by a single person.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the trailer hoist comprising the present invention illustrating a logging trailer in lifted or vertically displaced condition ready to be lowered onto the truck in order to carry the trailer away, with the novel reach guide yoke illustrated in its operating position eliminating lateral instability thus enabling the trailer to be readily placed on the truck;

FIGURE 2 is an enlarged partial front elevational view of the trailer hoist as illustrated in FIGURE 1;

FIGURE 3 is a vertical sectional view taken substantially on the plane of the line 3—3 of FIGURE 2, with parts in elevation for purposes of illustration;

FIGURE 4 is an enlarged partial vertical sectional view taken through the fairlead trunnion comprising a portion of the present invention;

FIGURE 5 is a front elevational view of the reach guide yoke illustrated in several of the above figures;

FIGURE 6 is a side elevational view, on a reduced scale, illustrating a logging trailer in its final piggy-back position on a truck; and FIGURE 7 is a partial perspective view of a modified embodiment of the present invention.

Referring now more specifically to the drawings, reference numeral 10 generally denotes a trailer cable hoist which is useful for lifting trailers of the type used in logging operations so that they may be placed on trucks such as the truck 12 for conveyance back to the log loading point. The truck 12, as illustrated in FIGURES 1 and 6 for example is of generally conventional variety including the body portion 14 having a cab guard 16, a bunk 18 and bunk stakes 20 and 22 thereon. Thus, it will be appreciated that the truck 12 is generally conventional. The truck 12 is normally used to pull a logging trailer of the type denoted by reference numeral 24 by means of the conventional hitching components denoted by reference numerals 26 and 28. Thus, it will be appreciated that the logging trailer 24 is generally conventional including the reach section 30, wheels 32, bunk 34 and bunk stakes 36 and 38. The trailer 24 is normally pulled by the truck 12 and logs are carried between the truck bunk 18 and trailer bunk 34. When the trailer 24 is unloaded, however, it has been found that it is more convenient to carry the trailer in piggy-back fashion as best illustrated in FIGURE 6, and thus it is necessary to lift the trailer by means of a trailer cable hoist machine as previously denoted by reference numeral 10.

The trailer cable hoist machine 10 is substantially conventional in construction, including the vertical side frame elements 40 and 42 in the form of I beams, the beams 40 and 42 being supported in upright condition in concrete connecting slabs 44. A crossbeam 46 connects the side beams 40 and 42 at the upper end thereof, and various connecting means such as the bolts 48 and struts 50 are utilized for purposes of structural strength and rigidity. Further, the gusset plates 52 are utilized in order to connect guy wires 54 to the side channel members 40 and 42 for purposes of stability, the guy wires including conventional turn-buckle tighteners 56 for adjustable connection to the connecting slabs 44. Further, a laterally extending tab 58 is connected to the side beam 42, and a connecting rod 60 is connected between the tab 58 and connecting slab 44 in order to add further stability to the device.

A conventional electric motor (not illustrated) as well as a cable winch drum generally denoted by reference numeral 62 are mounted on the cross member 46, and a case 64 is provided thereover to protect the motor and winch from the environmental elements. Referring to FIGURE 3 in particular, it will be observed that the winch 62 is mounted so that its longitudinal or rotational axis extends perpendicularly to the plane defined by the side frame elements 40 and 42, for a purpose to be explained more fully below. A cable 66 is wound on the winch drum 62 and a portion thereof extends downwardly between the I beams 68 and 70 comprising the cross member 46 and thus naturally between the side sections 40 and 42. An automatically releasable hook generally denoted by reference numeral 72 is connected to the end of the cable 66, the hook 72 being generally conventional and constructed in accordance with my prior U.S. Patent No. 2,771,316, Nov. 20, 1956.

The logging trailer 24 is conventionally supplied with a lifting strap 74 which will normally be engaged by the lift hook 72 in order to lift the logging trailer 24 upwardly for placement on the truck 12. It will be readily appreciated by referring to U.S. Patent No. 2,771,316, referred to above, that the hook 72 is automatically releasable whereby at a predetermined time, the lift strap 74 will be released and the logging trailer 24 freed to rest on the truck 12. Thus, in view of the above, it will be appreciated that the trailer cable hoist 10 is generally conventional in configuration, and that the logging trailer 24 is lifted by means of the cable 66, whereby without some means to prevent lateral movement thereof about the pivot point provided by the hook 72 and lift strap 74, it will be quite difficult to insure accurate and fast placement of the trailer 24 between the bunk stakes 20 and 22 and cab guard 16 of the truck 12.

In accordance with the present invention, a reach guide generally denoted by reference numeral 76 is provided in order to prevent lateral sway or swing of the trailer 24 as it is lifted by the cable 66. The reach guide 76 comprises a frame or arm section generally denoted by reference numeral 78 which includes a pair of side frame elements 80 and 82 in the form of generally U-shaped channel members, each of which is pivotally connected to one of a pair of arms 84 and 86 respectively which arms 84 and 86 are fixedly mounted in parallel relationship to the bottom of the cross section 46. Thus, by referring to FIGURES 2 and 3 in particular, it will be observed that a hinge bolt 88 pivotally connects each of the channel members 80 and 82 at the rear end thereof to the legs 84 and 86 respectively. It will be seen further that a cross member generally denoted by reference numeral 88 connects the channel members 80 and 82 substantially intermediate the ends thereof, the cross member 88 comprising a pair of angle irons 90 and 92 suitably connected to the channel members 80 and 82. The reach guide assembly 76 further includes a reach guide yoke generally denoted by the reference numeral 94 which includes a pair of vertical legs 96 and 98 each of which is pivotally connected at the upper end thereof by pins or bolts 100 to the ends of channel members 80 and 82 respectively. The legs 96 and 98 are connected by a cross member 102 and a yoke opening 104 is formed between the lower ends of the legs 96 and 98, the opening 104 tapering inwardly due to the inwardly converging members 106 and 108, leaving a rearmost generally rectangular area 110 therebetween. Thus, by viewing FIGURES 1, 2 and 5 in particular, it will be readily apparent that when the trailer 24 is lifted by cable 66, the reach pole 30 will be engaged in the yoke 94, and depending upon the size of the reach pole, will either engage the members 106 and 108 or will enter the area 110, as best illustrated in FIGURE 5.

A pair of motor actuator switches 112 and 114 are provided at the back and front ends of the hoist 10 whereby the winch motor will be actuatable from either position. Further, a walkway rail 116 is provided on the top of the cross member 46 in order to provide access to the motor and winch when necessary.

Referring now specifically to FIGURE 4, as well as to FIGURES 1 and 3, it will be observed that a pair of parallel cross legs 118 and 120 are mounted between the angle irons 90 and 92 of cross member 88, and a fairlead trunnion is rotatably mounted therebetween. The trunnion is preferably fabricated of manganese, but also may be of other suitable material. The cable 66 extends downwardly through the fairlead trunnion 122 and the trunnion will thus insure that the cable 66 will not be unduly worn, frayed or tangled as the hoist is used and the cable moved therethrough. A pair of chains 124 and 126 extend between the legs 84 and 86 and the channel members 80 and 82 respectively. The chains 124 and 126 will thus limit the extent to which the frame section 78 may be downwardly rotated.

In view of the foregoing, it should now be readily apparent that the hoist 10 with the reach guide 76 thereon will be used in the following manner: the guide 76 will normally be retained in substantially parallel relationship to the ground, as the cable 66 when fully withdrawn or wound on the drum 62 will pull the frame section 78 upwardly when the hook 72 contacts the trunnion 122, as the frame rotates about the bolts 88. When it is desired to use the hoist device 10, the driver will back a trailer under the hoist hook 72 with the lift strap 74 in alignment therewith, at which time the trailer 24 will be released from the truck, and the driver by actuating either switch 112 or 114 will be able to lower the hook 72 downwardly. The hook 72 will automatically hook the strap 74, and of course, as the hook 72 is lowered, the frame section 78 will be lowered until it is stopped by the limits of support chains 124 and 126. Of course, the cable 66 will continue to be lowered until the strap is hooked by hook 72. At this time, the driver will push the "up" button causing the motor to reverse and the cable to be wound upon the drum 62. Incidently, at this point, it will be well to explain that since the axis of rotation of the drum 62 is parallel with the position of the trailer 24 or perpendicular to the plane defined by uprights 40 and 42, and since the trunnion 122 will move longitudinally with respect to the uprights 40 and 42 as the frame section 78 is rotated about hinge bolts 88 (as the frame section 78 is raised the trunnion 122 will be moved to the left in viewing FIGURE 3 for example), while the cable 66 will also move longitudinally as it is being wound or unwound from the drum 62, thus the cable will remain in alignment with the trunnion 122 as the device is used.

As the trailer 24 is being raised, it will normally tilt rearwardly, as illustrated in FIGURE 3 for example, about the pivot point or lift strap 74 inasmuch as the greater amount of weight is rearwardly of this point, and the reach pole 30 will normally move upwardly through the opening 104 in the yoke 94 and come to rest either between the members 106 and 108 or in the chamber or area 110. The trailer 24 will thus continue to be raised to the position illustrated in ghost in FIGURE 3 and denoted by reference numeral 128, and the reach 30 which is in contact with the yoke 94 will thereby cause the reach guide 76 also to be raised to the position illustrated in ghost and denoted by reference numeral 130. Thus, it will be readily apparent that as the trailer 24 is raised, the reach pole 30 will be maintained in the yoke 94 and the trailer cannot twist out of loading position on the truck because it will be held by the guide 76. The hoist will normally stop automatically when the trailer is raised to a sufficient height above the ground, and the driver will now back his truck under the trailer and then lower the trailer onto the truck. The hook 72 will automatically release. The driver will then raise the cable 66 until the reach guide 76 is raised by the hook 72 and the operation is then completed. This complete cycle will normally be able to be completed in one and a half minutes, which is much faster and more efficient than was possible prior to my invention.

Referring now to FIGURE 7, it will be observed that the reach guide denoted above by reference numeral 76 may be employed with a conventional A frame 132, the reach guide being denoted in this instance by reference numeral 134. In this embodiment of the invention, the channel members 136 and 138, corresponding to channel members 80 and 82 above, are fixedly mounted to the underside of the A frame cross member 140, as for example by bolts 142. The channel members 136 and 138 are somewhat longer than the channel members 80 and 82 however, to compensate for the fact that they do not pivot at the rear ends thereof. A guide yoke 144 is pivotally mounted on pins or bolts 146 to the forward ends of the channel members 136 and 138, the guide yoke 144 being identical to the guide yoke 94 described above. This embodiment of the invention described immediately above and illustrated in FIGURE 7, is utilized in substantially the same manner as the first embodiment of the invention. Thus, a truck will drive through the A frame 132 under the cross member 140 and the trailer will be raised upwardly in a generally conventional manner, as for example by a truck mounted crane or the like. As the trailer is raised, the trailer reach pole 30 will naturally move into the opening 104 in the yoke 144 and thus any swing or sway of the reach will be prevented.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A machine for hoisting trailers of the type having elongate reach sections comprising, a hoist frame including an upper weight supporting section, hoisting means mounted on said upper section for connection with and hoisting a trailer upwardly toward said upper section for loading onto a carrier subsequently positioned therebeneath, and guide means dependingly supported from said frame independent of said hoisting means including trailer engaging means adapted to engage a trailer being hoisted at a point horizontally spaced from the point of connection of said hoisting means with said trailer and to coact with said hoisting means to prevent free swinging movement of said trailer relative to said upper section.

2. A machine for hoisting trailers of the type having elongate reach sections comprising, a hoist frame including a pair of spaced upstanding side sections and a connecting cross section, means mounted on said cross section for hoisting a trailer upwardly between said side sections for loading onto a carrier, and guide means operatably connected to said cross section for preventing swinging movement of the trailer when it is lifted off the ground, said guide means being pivotally connected at one end to said cross section.

3. A machine for hoisting trailers of the type having elongate reach sections comprising, a hoist frame including a pair of spaced upstanding side sections and a connecting cross section, means mounted on said cross section for hoisting a trailer upwardly between said side sections for loading onto a carrier, and guide means operatably connected to said cross section for preventing swinging movement of the trailer when it is lifted off the ground, said guide means being fixedly mounted at one end to said cross section.

4. The combination of claim 1 wherein said hoisting means comprises a drum mounted on said cross section, an elongated flexible tension member having one end wound upon said drum and a free depending end portion extending downwardly between said side sections, trunnion means on said guide means, said tension member extending downwardly and being guidingly received through said trunnion means.

5. A machine for hoisting trailers of the type having elongate reach sections comprising, a hoist frame including a pair of spaced upstanding side sections and a connecting cross section, means mounted on said cross section for hoisting a trailer upwardly between said side sections for loading onto a carrier, and guide means operatably connected to said cross section for preventing swinging movement of the trailer when it is lifted off the ground, said hoisting means comprising a cable drum mounted on said cross section, a cable wound upon said drum and a portion of said cable extending downwardly between said side sections, trunnion means on said guide means, said cable extending downwardly through said trunnion means, said guide means comprising a frame section pivotally mounted at one end to said cross section, said trunnion means carried by said frame section intermediate its opposite ends, a guide section pivotally mounted at the other end of said frame section, said guide section comprising a yoke for engaging the trailer reach section as the trailer is lifted by said cable thereby preventing lateral swinging motion thereof.

6. The combination of claim 4 wherein said guide means comprises a frame section pivotally mounted at one end to said cross section, said trunnion means carried by said frame section, said cable drum oriented with its axis of rotation perpendicular to the plane defined by said side sections whereby said portion of the cable will move along said axis as said drum is rotated, said trunnion means arranged to follow the movement of said cable portion as said frame section is rotated.

7. A machine for hoisting trailers of the type having elongate reach sections comprising, a hoist frame including a pair of spaced upstanding side sections and a connecting cross section, means mounted on said cross section for hoisting a trailer upwardly between said side sections for loading onto a carrier, and guide means operatably connected to said cross section for preventing swinging movement of the trailer when it is lifted off the ground, said guide means comprising a frame section pivotally mounted at one end to said cross section, said trunnion means carried by said frame section, a guide section pivotally mounted at the other end of said frame section, said guide section engaging the trailer reach section as the trailer is lifted by said cable thereby preventing lateral swinging motion thereof.

8. In a cable hoisting machine for trailers of the type having elongate reach sections, the improvement comprising, guide means on said hoist means for preventing lateral sway of the trailer as it is raised from the ground, and fairlead means carried by said guide means for guiding said cable, said guide means comprising a frame section pivotally mounted at one end on said cable hoisting machine, yoke means pivotally hung at the other end of said frame section, means for limiting the downward rotation of said other end of said frame section, said yoke engaging the reach of a trailer lifted by said hoisting machine thereby limiting any lateral swinging or sway thereof.

9. A machine for hoisting a trailer of the type including an elongated longitudinally extending tongue portion projecting forwardly of the longitudinal center of gravity of said trailer, said machine including a frame having an elevated frame section beneath which said trailer may be rolled, hoisting means in the form of a winding member journaled from said frame section and an elongated flexible tension member having one end portion secured to said winding member for winding thereon and unwinding therefrom and a free end portion depending downwardly from said frame section, the lower end portion of said tension member having means thereon adapted for securement to said trailer adjacent said center of gravity, said machine including depending guide means disposed in an upstanding plane spaced horizontally from said free end portion of said tension member and adapted to engage and prevent angular displacement of said tongue portion about said free end portion upon elevation of said trailer by partial winding of said free end portion on said winding member.

10. The combination of claim 9 wherein said depending guide means defines a downwardly opening inverted channel-shaped area whose longitudinal center axis is substantially aligned with said free end portion.

11. The combination of claim 10 wherein said guide means is carried by the free end portion of an elongated arm structure disposed and swingable in an upstanding plane generally paralleling an upstanding plane containing the longitudinal center axis of said channel-shaped area, the other end of said arm structure being pivotally supported from said frame about a horizontal axis extending transversely of said longitudinal center axis and stationarily positioned relative to said elevated frame section.

12. The combination of claim 11 including means operatively connected between said arm structure and the remainder of said frame limiting downward swinging movement of the free end portion of said arm structure.

13. The combination of claim 9 wherein said depending guide means defines a downwardly opening inverted channel-shaped area whose longitudinal center axis is substantially aligned with said free end portion, said guide means being carried by the free end portion of an elongated arm structure disposed and swingable in an upstanding plane generally paralleling an upstanding plane containing the longitudinal center axis of said channel-shaped area, the other end of said arm structure being pivotally supported from said frame about a horizontal axis extending transversely of said longitudinal center axis and stationarily positioned relative to said elevated frame section, said free end portion of said tension member dependingly downwardly intermediate said free end of said arm structure and said horizontal axis, said arm structure including fairlead means through which said free end portion of said elongated tension member is slidably received.

References Cited

UNITED STATES PATENTS

| 77,706 | 5/1868 | Arden | 254—47 |
| 127,095 | 5/1872 | McMillian | 254—47 |

EVON C. BLUNK, *Primary Examiner.*

H. C. HORNSBY, *Assistant Examiner.*